Patented Mar. 27, 1951

2,546,895

UNITED STATES PATENT OFFICE 2,546,895

AERIAL DISINFECTANTS AND METHOD OF USING THE SAME

Charles I. Jarowski, Flushing, N. Y., assignor to Vick Chemical Company, New York, N. Y., a corporation of Delaware No Drawing. Application April 16, 1948, Serial No. 21,565

8 Claims. (Cl. 167—25)

This invention relates to aerial disinfectants and also relates to a method for their use.

The use of certain chemicals which are sprayed into the air to kill pathogenic bacteria and viruses in the air has gained increasing prominence in recent years. The most widely used and practically tested of these chemicals are propylene glycol and triethylene glycol, but these compounds are not volatile when steam vaporized and are hence not active as aerial germicides when so used. Furthermore, there is no known instance in which a chemical compound or other composition has been vaporized to kill bacteria or viruses suspended in the air in a room or other space which is concomitantly occupied by human beings.

The foregoing being in brief the state of the art, it is therefore an object of this invention to provide a composition which may be vaporized into the air in a room or other space in order to kill pathogenic bacteria and viruses suspended therein.

It is also an object of this invention to provide a composition which may be safely vaporized into the air in a room or other space to kill pathogenic bacteria and viruses suspended therein, the composition being suitable for vaporization therein while the room or other space is being occupied by human beings.

It is a further object of the present invention to provide a method for using such a composition having the aforementioned properties. Other objects of this invention will appear hereinafter.

The foregoing and other objects are accomplished in accordance with the present invention in part by providing a composition containing a cyclohexyl alkyl monocarboxylic acid and an aromatic essential oil medication. The cyclohexyl alkyl monocarboxylic acids contained in the composition of this invention are those comprehended by the generic formula R—(CH$_2$)$_n$—COOH in which R is the cyclohexyl radical and $n$ is an integer from one to nine. The aforementioned are of course known chemical compounds, and therefore their method of preparation need not be described herein.

The preparation of the aromatic essential oil medication component of the composition of the present invention is well understood in the art. For example, a suitable medication of that character may be prepared by mixing in known manner the ingredients shown in the table below.

| Ingredient: | Parts by weight |
|---|---|
| Camphor | 5 |
| Menthol | 6 |
| Oil of eucalyptus | 14 |
| Oil of red thyme | 1 |
| Turpentine | 8 |
| Methyl salicylate | 8 |
| Oil of pine needles | 21 |
| Bornyl acetate | 10 |
| Isobornyl acetate | 20 |
| Oil of niaouli | 3 |
| Oil of lavender | 4 |

A composition falling within the scope of the present invention may be prepared by mixing the medication of the table with a suitable amount of one of the acids comprehended by the generic formula given above, for example, 2-cyclohexyl acetic acid, 4-cyclohexyl butyric acid, 5-cyclohexyl valeric acid, 6-cyclo hexyl hexanoic acid, 3-cyclohexyl propionic acid, 7-cyclohexyl heptanoic acid, 8-cyclohexyl octanoic acid, 9-cyclohexyl nonanoic acid, 10-cyclohexyl decanoic acid, etc. The relative amounts by weight of the monocarboxylic acid and aromatic essential oil medication contained in the composition are dictated by considerations of choice, rather than by considerations of operability; in general, however, it is preferred that the composition of the present invention should contain from about one to about three parts of monocarboxylic acid, or a mixture of such acids, per part of aromatic essential oil medication.

As is understood in the art, the aromatic essential oil medication component of the composition described herein may be prepared using a wide variety of essential oils in addition to those specifically disclosed in the table above. Among such essential oils which may be substituted for those specifically disclosed in the table are oil of origanum, oil of cinnamon, oil of cassia, oil of cloves, oil of bay, oil of sassafras, oil of peppermint, oil of cajuput, oil of sandalwood, oil of spearmint, oil of anise, oil of bergamot, oil of juniper, oil of cade, oil of cedar leaf, oil of nutmeg, etc. Furthermore, as the specific composition of the table illustrates, the aromatic essential oil medication component may contain materials which are either constituents of essential oils or which are conventionally employed in the preparation of aromatic essential oil medications, such as camphor, menthol, thymol, methyl salicylate, bornyl acetate, and isobornyl acetate. It is not essential, however, that the aromatic essential oil medication component contain those specific materials.

In accordance with the method of the present invention, the composition already described may be advantageously employed as follows: A suitable amount of the composition is placed in an 0.2% solution of sodium chloride in water in the glass chamber of an ordinary household electric steam vaporizer, the composition being placed directly in the sodium chloride solution, rather than in the medication cup which is usually provided in most of the conventional vaporizers of the aforementioned type. The electric current is then turned on, and upon the generation of steam the composition is steam vaporized in the room or other space surrounding the vaporizer. Preferably, the air is agitated, for example, by means of a fan, in order to disperse the steam vaporized composition. A significant kill of Staph. aureus (concentration 16,000 per cubic foot of air) is obtained in a short period of time when sufficient composition of the preferred range of ingredients is vaporized into the air so that one part of 3-cyclohexyl propionic acid per 700,000,000 parts of air is vaporized. Similar results are obtained with the composition when the following acids in the following proportions to air are vaporized into air containing the aforementioned concentration of Staph. aureus: 4-cyclohexyl butyric acid, 1:410,000,000; 5-cyclohexyl valeric acid, 1:340,000,000; and 6-cyclohexyl hexanoic acid, 1:280,000,000. The aforementioned figures are of course merely estimates with respect to the concentration of the composition in the air, since the steam vaporized composition is absorbed on the surface of walls and objects in the room or other space, so that the actual concentration in the air of the composition is probably considerably less than those aforementioned. Tests have, furthermore, indicated that air purified in the aforementioned manner possesses no adverse toxicity effect upon warm-blooded animals. In addition, tests have shown that other organisms, such as streptococci and pneumococci, in addition to staphylococci, may be satisfactorily killed in accordance with the procedure just described.

The method of the present invention is satisfactory for killing bacteria suspended in air at ordinary temperatures. However, the relative humidity of the air being purified has some effect upon the germicidal action of the composition of the present invention when vaporized therein. Thus, when the humidity increases beyond about 75%, the effectiveness of the vaporized composition becomes progressively less, until in the range of about 90% humidity there is no significant killing of the bacteria in the air. Of course, air having a relative humidity of less than 75% may be effectively purified of bacteria by vaporizing therein the composition of this invention.

The particular method employed in vaporizing the composition into the air may also be varied from that disclosed specifically above. For example, the composition may be steam vaporized when contained in an ordinary kettle placed upon a stove, or the composition may be vaporized in known manner by spraying or atomizing it with air or gases under pressure, e. g., by using a conventional aerosol bomb.

The compositions disclosed herein also possess an additional advantage in that when vaporized into air they possess a virucidal action. Thus, they may be effectively used for the purpose of purifying air containing the influenza A virus.

I claim:
1. A composition suitable for use in purifying air when vaporized therein, said composition comprising aromatic essential oil having dissolved therein a compound of the generic formula $R-(CH_2)_n-COOH$ in which R is the cyclohexyl radical and $n$ is an integer from 1 to 9, said composition being vaporizable with steam and when vaporized in air being characterized by its ability to kill bacteria when the relative humidity of the air is maintained below about 75%.

2. The composition of claim 1 in which $n$ is 5.
3. The composition of claim 1 in which $n$ is 6.
4. The composition of claim 1 in which $n$ is 8.
5. The method of purifying air by destroying bacteria in the air which comprises vaporizing therein a composition comprising aromatic essential oil having dissolved therein a compound having the generic formula $R-(CH_2)_n-COOH$ in which R is the cyclohexyl radical and $n$ is an integer from 1 to 9, and during the vaporizing operation maintaining the humidity of the air below about 75%.
6. The method of claim 5 in which $n$ is 5.
7. The method of claim 5 in which $n$ is 6.
8. The method of claim 5 in which $n$ is 8.

CHARLES I. JAROWSKI.

REFERENCES CITED

The following references are of record in the file of this patent:

UNITED STATES PATENTS

| Number | Name | Date |
|---|---|---|
| 1,693,801 | Adams et al. | Dec. 4, 1928 |
| 2,396,012 | Jones et al. | Mar. 5, 1946 |

OTHER REFERENCES

Wood et al., United States Dispensatory, 21st ed., 1926, J. P. Lippincott Co., Philadelphia, page 736.

Rudolfs, Bulletin 496, N. J. Agr. Exper. Sta., March 1930, pp. 1-24.

Lesser, Soap and Sanitary Chemicals, May 1947, pp. 131, 133, 135 and 151.

Roberts et al., U.S.D.A. Tech. Bull. No. 328, November 1932, pp. 48-51.